US012627232B2

(12) United States Patent
Hayakawa

(10) Patent No.: US 12,627,232 B2
(45) Date of Patent: May 12, 2026

(54) DC/DC CONVERTER HAVING A COIL CONNECTED TO A CONNECTION POINT BETWEEN TWO SWITCHES CONNECTED IN SERIES

(71) Applicant: Torex Semiconductor Ltd., Tokyo (JP)

(72) Inventor: Kousuke Hayakawa, Tokyo (JP)

(73) Assignee: Torex Semiconductor Ltd., Tokyo (JP)

( * ) Notice: Subject to any disclaimer, the term of this patent is extended or adjusted under 35 U.S.C. 154(b) by 256 days.

(21) Appl. No.: 18/702,877

(22) PCT Filed: Oct. 20, 2022

(86) PCT No.: PCT/JP2022/039076

§ 371 (c)(1),
(2) Date: Apr. 19, 2024

(87) PCT Pub. No.: WO2023/068324

PCT Pub. Date: Apr. 27, 2023

(65) Prior Publication Data

US 2025/0233498 A1 Jul. 17, 2025

(30) Foreign Application Priority Data

Oct. 21, 2021 (JP) ................................. 2021-172741

(51) Int. Cl.
*H02M 3/158* (2006.01)
*H02M 1/00* (2006.01)
(Continued)

(52) U.S. Cl.
CPC ......... *H02M 3/158* (2013.01); *H02M 1/0009* (2021.05); *H02M 1/0025* (2021.05);
(Continued)

(58) Field of Classification Search
CPC ............. H02M 1/0032; H02M 1/0009; H02M 1/0025; H02M 1/0054; H02M 3/158;
(Continued)

(56) References Cited

U.S. PATENT DOCUMENTS 7,109,688 B1 * 9/2006 Chiu ....................... H02M 1/36
323/284
7,336,060 B2 * 2/2008 Ito ....................... H02M 3/1588
323/299
(Continued)

FOREIGN PATENT DOCUMENTS

JP 4674661 B2 4/2011
JP 201234519 A 2/2012
(Continued)

*Primary Examiner* — Yusef A Ahmed
(74) *Attorney, Agent, or Firm* — The Webb Law Firm

(57) ABSTRACT

A DC/DC converter has a coil connected to a connection point between a main switch and a subordinate switch connected in series; and alternately turns on/off the main switch and the subordinate switch, thereby converting a direct current input voltage into a predetermined direct current output voltage. The DC/DC converter includes a current mode detection unit for detecting either a continuous current mode in which a current flowing through the coil does not pass through a zero point, or a discontinuous current mode in which the current flowing through the coil passes through the zero point, when the subordinate switch is ON; and a subordinate switch control unit for controlling the ON time of the subordinate switch in a next or later cycle, based on a time from turning-off of the subordinate switch until a voltage at the connection point reaches a predetermined threshold value.

8 Claims, 11 Drawing Sheets

(51) Int. Cl.
    *H02M 1/32*         (2007.01)
    *H02M 3/155*      (2006.01)

(52) U.S. Cl.
    CPC ....... *H02M 1/0032* (2021.05); *H02M 1/0048*
        (2021.05); *H02M 1/0054* (2021.05); *H02M*
        *1/32* (2013.01); *H02M 3/155* (2013.01);
        *H02M 3/1588* (2013.01)

(58) Field of Classification Search
    CPC .... H02M 1/0048; H02M 1/32; H02M 3/1588;
        H02M 3/155; H02M 1/0012; Y02B 70/10
    See application file for complete search history.

(56)             References Cited

U.S. PATENT DOCUMENTS

| | | | | |
|---|---|---|---|---|
| 7,598,715 | B1 * | 10/2009 | Hariman | H02M 3/1588 323/222 |
| 10,666,142 | B2 * | 5/2020 | Vanin | H03K 7/08 |
| 10,715,039 | B1 * | 7/2020 | Ilango | G01R 19/175 |
| 2005/0057238 | A1 * | 3/2005 | Yoshida | H02M 3/156 323/282 |
| 2006/0113980 | A1 * | 6/2006 | Yoshida | H02M 3/1588 323/282 |
| 2006/0164057 | A1 * | 7/2006 | Kudo | H02M 3/1588 323/282 |
| 2009/0079410 | A1 * | 3/2009 | Ohkawa | H02M 3/1588 323/290 |
| 2010/0102788 | A1 * | 4/2010 | Kuroyabu | H02M 3/156 323/282 |
| 2010/0283442 | A1 * | 11/2010 | Nakashima | H02M 3/1588 323/283 |
| 2011/0050185 | A1 * | 3/2011 | Notman | H02M 3/1588 323/271 |
| 2011/0175581 | A1 * | 7/2011 | Hane | H02M 3/156 323/271 |
| 2012/0025797 | A1 * | 2/2012 | Futamura | H02M 3/156 323/283 |
| 2012/0105031 | A1 * | 5/2012 | Kumagai | H02M 3/156 323/271 |
| 2014/0043004 | A1 | 2/2014 | Abramov | |
| 2014/0145692 | A1 * | 5/2014 | Miyamae | H02M 3/158 323/271 |
| 2015/0108954 | A1 * | 4/2015 | Yu | H02M 3/156 323/271 |
| 2016/0028311 | A1 * | 1/2016 | Murakami | H02M 3/1588 323/271 |
| 2016/0141959 | A1 * | 5/2016 | Murakami | H02M 3/1588 323/271 |
| 2016/0233768 | A1 * | 8/2016 | de Cremoux | H02M 3/1588 |
| 2016/0301309 | A1 * | 10/2016 | Tateishi | H02M 1/08 |
| 2016/0380539 | A1 * | 12/2016 | Fukumoto | H02M 3/1588 323/271 |
| 2017/0271991 | A1 * | 9/2017 | Tsuruyama | H02M 3/1588 |
| 2018/0131275 | A1 * | 5/2018 | Guan | H02M 3/156 |
| 2019/0081546 | A1 * | 3/2019 | Hsu | H02M 3/158 |
| 2021/0211048 | A1 * | 7/2021 | Yu | H02M 1/0029 |
| 2023/0198395 | A1 * | 6/2023 | Sun | H02M 1/0025 323/282 |
| 2023/0387805 | A1 * | 11/2023 | Akaho | H02M 1/0009 |

FOREIGN PATENT DOCUMENTS

| | | | |
|---|---|---|---|
| JP | 6914398 | B1 | 7/2021 |
| WO | 2006123738 | A1 | 11/2006 |

\* cited by examiner (a) COIL CURRENT

Vin (b) LX VOLTAGE

GND (c) SYNC-CHG

SYNC-RAMP (a) COIL CURRENT (b) LX VOLTAGE (c) SYNC-RAMP SYNC-CHG (a) COIL CURRENT (b) LX VOLTAGE (c) SYNC-RAMP SYNC-CHG

DC/DC CONVERTER HAVING A COIL CONNECTED TO A CONNECTION POINT BETWEEN TWO SWITCHES CONNECTED IN SERIES

CROSS REFERENCE TO RELATED APPLICATIONS

This application is the United States national phase of International Patent Application No. PCT/JP2022/039076 filed Oct. 20, 2022, and claims priority to Japanese Patent Application No. 2021-172741 filed Oct. 21, 2021, the disclosures of which are hereby incorporated by reference in their entireties.

BACKGROUND OF THE INVENTION

Field of the Invention

This invention relates to a DC/DC converter and, more specifically, to that useful when applied to driving in two drive modes, i.e., a PWM mode adapted for a heavy load and a PFM mode for a light load.

Description of Related Art

As a DC/DC converter, wide use is made of one which has a coil connected to a connection point between two switching means connected in series, and performs a switching action for alternately turning on/off the main switching means (one of the two switching means which is turned on when energy is stored in the coil), and the subordinate switching means (the other of the two switching means which is turned on when the energy stored in the coil is sent out to the output side), thereby converting a direct current input voltage into a predetermined direct current output voltage.

As a type of such a DC/DC converter, a proposal has been made for one equipped with a subordinate switch control means, which controls the ON time of the subordinate switching means in a next or later cycle, based on a time elapsing from the turning-off of the subordinate switching means until a predetermined threshold value lying within a range between the minimum value and the maximum value of the voltage of the rising waveform of the connection point (in the case of a step-down type) is reached, in an attempt to prevent, without fail, a harmful phenomenon due to the reversal of the polarity of a current flowing through the coil. This type of DC/DC converter has become publicly known (see JP 4674661).

The DC/DC converter disclosed in JP 4674661 has faced the following problem: If there are two current modes, i.e., a continuous current mode (CCM) in which a coil current flowing through the coil does not pass through a zero point, and a discontinuous current mode (DCM) in which the coil current flowing through the coil passes through the zero point, during the switching action of the switching means, an error occurs between control in the continuous current mode and control in the discontinuous current mode.

In detail, with the DC/DC converter disclosed in JP 4674661, the period from the turning-off of the subordinate switching means until the voltage at the connection point reaches the predetermined threshold value may be longer in the discontinuous current mode than in the continuous current mode. The reason is as follows: In the continuous current mode, after the subordinate switching means is turned off, the voltage at the connection point instantaneously rises vertically. In the discontinuous current mode, on the other hand, after the subordinate switching means is turned off, ringing is induced in the voltage at the connection point owing to resonance of the coil and parasitic capacity present at the connection point, so that the above voltage rises gently. That is, compared with the time until the threshold value is reached in the former case, the time until the threshold value is reached delays in the latter case.

With the DC/DC converter disclosed in JP 4674661, as noted above, a deviation arises between the time from the turning-off of the subordinate switching means until the voltage at the connection point reaches the predetermined threshold value in the continuous current mode and that in the discontinuous current mode. The deviation causes the error between the predetermined control in the continuous current mode and that in the discontinuous current mode.

As a result, a phenomenon in which the coil current flows backward from the output side to the ground side may occur. Such a phenomenon results in an outputted charge being discarded into the ground GND, thus inducing a decrease in the efficiency of the DC/DC converter.

SUMMARY OF THE INVENTION

The present invention has been accomplished in the light of the prior art as described above. It is an object of the invention to provide a DC/DC converter which is driven in a continuous current mode and a discontinuous current mode, and which can exercise predetermined control accurately without causing an error when controlling the ON time of a subordinate switching means in a next cycle based on a time from the turning-off of the subordinate switching means until a voltage at a connection point connected to an end of a coil reaches a predetermined threshold value.

A first aspect of the present invention for attaining the above object is a DC/DC converter which has a coil connected to a connection point between two switching means connected in series; uses as a main switching means one switching means of the two switching means being turned on when energy is stored in the coil, and as a subordinate switching means the other switching means of the two switching means being turned on when the energy stored in the coil is sent out to an output side; and performs a switching action for alternately turning on/off the main switching means and the subordinate switching means, thereby converting a direct current input voltage into a predetermined direct current output voltage, the DC/DC converter comprising:

current mode detection means for detecting either a continuous current mode in which a current flowing through the coil does not reach zero, or a discontinuous current mode in which the current flowing through the coil reaches zero, when the main switching means is OFF; and subordinate switch control means for controlling an ON time of the subordinate switching means in a next or later cycle, based on a time from turning-off of the subordinate switching means until a voltage at the connection point reaches a predetermined threshold value lying within a range between the minimum value and the maximum value of the voltage, wherein if the discontinuous current mode is detected based on results of detection by the current mode detection means, the subordinate switch control means performs a correction on the controlled ON time of the subordinate switching means in the next or later cycle.

A second aspect of the present invention is the DC/DC converter according to the first aspect, wherein the subordinate switch control means is adapted to control the ON time of the subordinate switching means in the next or later cycle so that the polarity of the current flowing through the coil is not reversed.

A third aspect of the present invention is the DC/DC converter according to the first or second aspect, wherein the subordinate switch control means exercises control based on the value of the voltage which varies in one direction so as to rise or fall depending on the time from the turning-off of the subordinate switching means until the voltage at the connection point reaches the threshold value.

A fourth aspect of the present invention is the DC/DC converter according to the first or second aspect, wherein the subordinate switch control means exercises control based on the value of a voltage which varies in one direction so as to rise or fall depending on the time from the turning-off of the subordinate switching means until the voltage at the connection point reaches the threshold value; and which falls or rises by a constant amount in a direction opposite to the direction of varying so as to rise or fall similarly in each cycle.

A fifth aspect of the present invention is the DC/DC converter according to the first or second aspect, wherein the subordinate switch control means compares the value of the voltage which varies in one direction so as to rise or fall depending on the time from the turning-off of the subordinate switching means until the voltage at the connection point reaches the threshold value; and which falls or rises by the constant amount in the direction opposite to the direction of varying so as to rise or fall similarly in each cycle, with the value of a voltage varying in the one direction by rising or falling in value depending on the ON time of the subordinate switching means, to exercise control.

A sixth aspect of the present invention is the DC/DC converter according to any one of the third to fifth aspects, wherein the subordinate switch control means decreases the rise rate of the voltage, which rises depending on the time from the turning-off of the subordinate switching means until the voltage at the connection point reaches the threshold value, thereby performing the correction.

A seventh aspect of the present invention is the DC/DC converter according to the fourth or fifth aspect, wherein the subordinate switch control means increases the value of the voltage, which falls in each cycle, thereby performing the correction.

According to the present invention, when in the discontinuous current mode the ON time of the subordinate switching means in the next cycle is controlled based on the time from the turning-off of the subordinate switching means until the coil voltage reaches the predetermined threshold value, the ON time is corrected. Thus, backflow of the coil current due to the ringing of the voltage at the connection point is prevented, and the high-efficiency operation of the DC/DC converter is ensured.

BRIEF DESCRIPTION OF THE DRAWINGS

The terms Fig., Figs., Figure, and Figures are used interchangeably in the specification to refer to the corresponding figures in the drawings

DESCRIPTION OF THE INVENTION

An embodiment of the present invention will now be described in detail with reference to the accompanying drawings.

Figure 1:
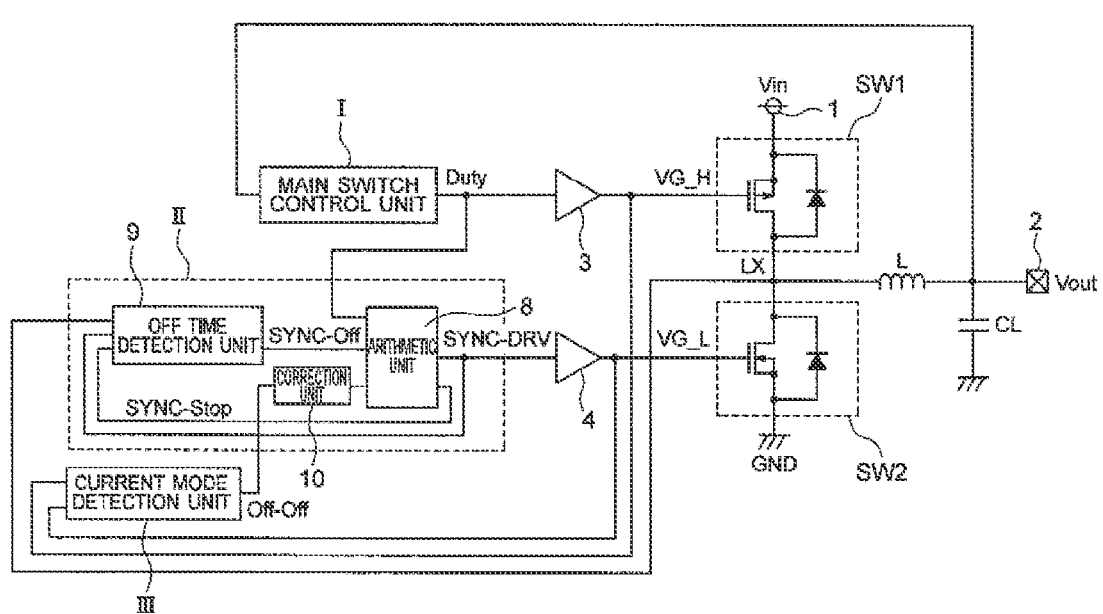
FIG. 1 is a block diagram showing the whole of a step-down DC/DC converter according to an embodiment of the present invention.

FIG. 1 is a block diagram showing the whole of a DC/DC converter according to the embodiment of the present invention. The DC/DC converter according to the present embodiment is an example of a step-down DC/DC converter. However, an example of a step-up DC/DC converter is also included in the technical ideas of the present invention.

As shown in FIG. 1, the DC/DC converter according to the present embodiment accepts as an input a direct current voltage Vin applied to an input terminal 1 from a direct current power source, stores energy supplied from the direct current power source in a coil L, and supplies the energy stored in the coil L to a load as a direct current voltage Vout via an output terminal 2. Since the present embodiment concerns the step-down type, the direct current voltage Vout lower than the inputted direct current voltage Vin is outputted from the output terminal 2.

A main switch SW1, which is turned on when energy is stored in the coil L, is connected between the input terminal 1 and the coil L. A subordinate switch SW2, which is turned on when the energy stored in the coil L is sent out to the output terminal 2, is connected between the ground GND and the coil L. To a connection point LX between the main switch SW1 and the subordinate switch SW2, which is formed in this manner, is connected one end of the coil L. The other end of the coil L is connected to the output terminal 2 and a voltage smoothing capacitor CL.

The main switch SW1 in the present embodiment is a PMOS transistor. Thus, a source terminal has the direct current voltage Vin, a drain terminal has the voltage at the connection point LX, and a gate terminal is supplied with a drive signal VG_H of a main switch drive unit 3. The subordinate switch SW2 is an NMOS transistor. Thus, a source terminal has the voltage at the ground GND, a drain terminal has the voltage at the connection point LX, and a gate terminal is supplied with a drive signal VG_L of a subordinate switch drive unit 4.

The main switch drive unit 3 controls ON/OFF of the main switch SW1 by the drive signal VG_H according to an output signal Duty supplied from a main switch control unit I. The subordinate switch drive unit 4 controls ON/OFF of the subordinate switch SW2 by the drive signal VG_L according to an output signal SYNC-DRV supplied from a subordinate switch control unit II.

The main switch control unit I generates the output signal Duty, which controls ON/OFF of the main switch SW1, based on the direct current voltage Vout fed back from the output terminal 2. The subordinate switch control unit II generates the output signal SYNC-DRV, which controls ON/OFF of the subordinate switch SW2, based on the output signal Duty, the voltage at the connection point LX, and an output signal Off-Off of a current mode detection unit III. Details of the subordinate switch control unit II will be described later by reference to FIG. 3.

The current mode detection unit III judges whether the current mode is a discontinuous current mode in which the current flowing through the coil L when the energy stored in the coil is delivered toward the output terminal 2 reaches zero, or a continuous current mode in which the current flowing through the coil L when the energy stored in the coil L is delivered to the output does not reach zero. Based on the drive signal VG_H of the main switch drive unit 3 and the drive signal VG_L of the subordinate switch drive unit 4, the current mode detection unit III outputs the judgment signal Off-Off representing predetermined judgment results. Details of the current mode detection unit III will be described later by reference to FIG. 4.

Figure 2:
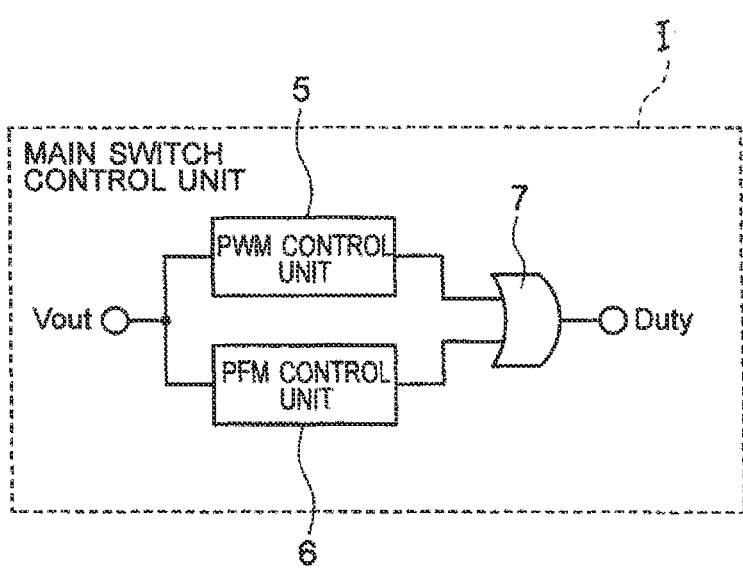
FIG. 2 is a block diagram showing a main switch control unit of FIG. 1 in an extracted and detailed manner.

FIG. 2 is a block diagram showing the main switch control unit of FIG. 1 in an extracted and detailed manner. As shown in the drawing, the main switch control unit I generates the output signal Duty, which controls ON/OFF of the main switch SW1, based on the fed-back direct current voltage Vout. The main switch control unit I has a PWM control unit 5 for controlling the main switch SW1 in the continuous current mode, a PFM control unit 6 for controlling the main switch SW1 in the discontinuous current mode, and an OR circuit 7 for sending out either a PWM signal or a PFM signal as the output signal Duty. The drive signal VG_H of the same logic as that of the output signal Duty is supplied to the main switch SW1 via the main switch drive unit 3. The main switch SW1 is turned on when the output signal Duty is at a Lo level, but is turned off when the output signal Duty is at a Hi level.

Figure 3:
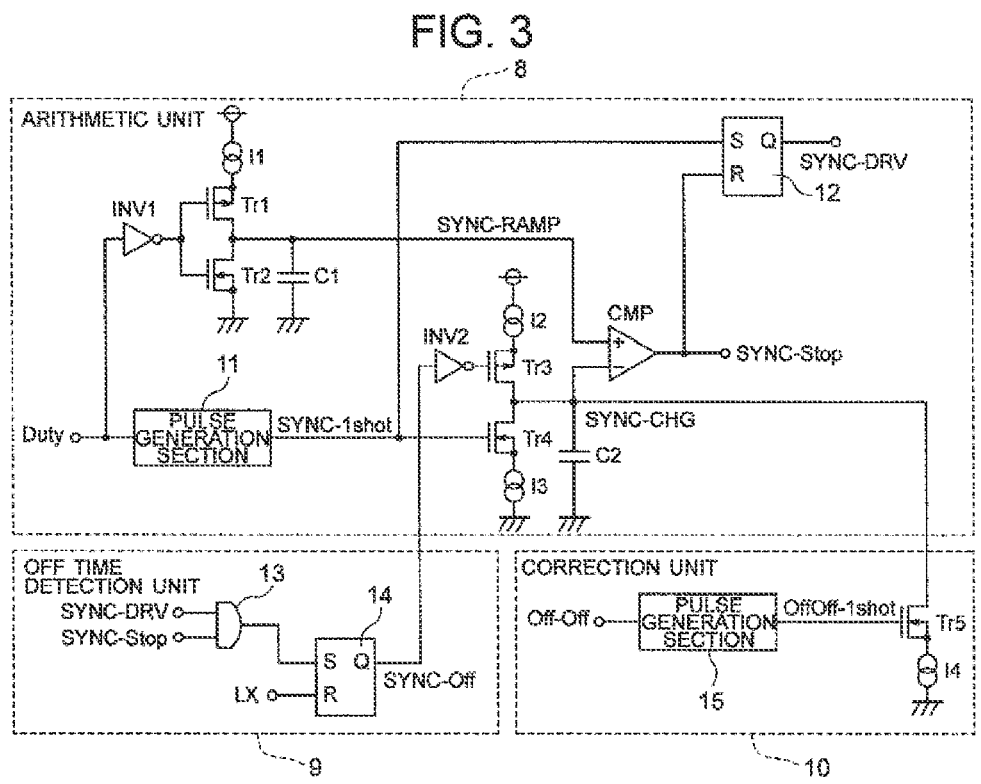
FIG. 3 is a block diagram showing a subordinate switch control unit of FIG. 1 in an extracted and detailed manner.

FIG. 3 is a block diagram showing the subordinate switch control unit of FIG. 1 in an extracted and detailed manner. As shown in the drawing, the subordinate switch control unit II transmits the output signal SYNC-DRV, which controls ON/OFF of the subordinate switch SW2, based on the output signal Duty, the signal from the connection point LX between the main switch SW1 and the subordinate switch SW2, and the output signal Off-Off of the current mode detection unit III. The subordinate switch control unit II has an arithmetic unit 8 for determining the ON time of the subordinate switch SW2, an OFF time detection unit 9 for detecting the time from turning-off of the subordinate switch SW2 until the signal from the connection point LX reaches a predetermined threshold value, and a correction unit 10 for correcting the ON time determined by the arithmetic unit 8 in the discontinuous current mode.

In the arithmetic unit 8, a comparison is made between a charge signal SYNC-CHG, which rises in voltage value depending on the time from turning-off of the subordinate switch SW2 until the connection point LX reaches the predetermined threshold value and which falls by a constant value in each cycle, and a ramp signal SYNC-RAMP which rises in value depending on the ON time of the subordinate switch SW2, so that the ON time of the subordinate switch SW2 is determined. A pulse generation section 11 within the arithmetic unit 8 is given the output signal Duty by the main switch control unit I. In the pulse generation section 11, a pulse signal SYNC-1shot, which is a Hi pulse persisting for a prescribed time, is generated at a timing when the level of the output signal Duty changes from Lo to Hi.

The pulse signal SYNC-1shot is given to a set terminal of an SR latch circuit 12 and, when the pulse signal SYNC-1shot becomes Hi, the output signal SYNC-DRV of the SR latch 12 becomes Hi. In this manner, the drive signal VG_L of the same logic as that of the output signal SYNC-DRV is supplied to the subordinate switch SW2 via the subordinate switch drive unit 4. Thus, at a timing when the level of the output signal Duty reaches Hi, the output signal SYNC-DRV of the arithmetic unit 8 outputs Hi, turning the subordinate switch SW2 on.

Moreover, the output signal Duty is inverted by an inverter INV1, and imparted to a PMOS transistor Tr1 and an NMOS transistor Tr2. Thus, when the output signal Duty is Lo, the output of the inverter INV1 is at a Hi level. Hence, the transistor Tr1 is in an OFF state, while the transistor Tr2 is in an ON state. At this time, therefore, the ramp signal SYNC-RAMP is at a ground GND level.

When the output signal Duty changes from Lo to Hi, the transistor Tr1 is switched from OFF to ON, while the transistor Tr2 is switched from ON to OFF. Here, a current source I1 is disposed between the transistor Tr1 and the power source of the arithmetic unit 8. When the transistor Tr1 is switched from OFF to ON, therefore, a current supplied from the current source I1 is given to the ramp signal SYNC-RAMP via the transistor Tr1.

A capacity C1 is provided between the ramp signal SYNC-RAMP and the ground GND. Thus, the voltage value of the ramp signal SYNC-RAMP rises from the GND level in direct proportion to a time which has elapsed since the transistor Tr1 was turned from OFF to ON, and the value of the current supplied from the current source I1; and in inverse proportion to the capacity value of the capacity C1. That is, the ramp signal SYNC-RAMP is at the ground GND level during a time when the output signal Duty remains at the Lo level and the subordinate switch SW2 is being controlled and driven to OFF. In direct proportion to the time that has elapsed since the output signal Duty changed from the Lo level to the Hi level and the subordinate switch SW2 was controlled and driven from OFF to ON, the ramp signal SYNC-RAMP rises in the level of the voltage value.

The ramp signal SYNC-RAMP is supplied to a non-inverting input terminal of a comparator CMP, and compared with the charge signal SYNC-CHG supplied to an inverting input terminal of the comparator CMP. The charge signal SYNC-CHG has a voltage value controlled by an output signal SYNC-Off from the OFF time detection unit 9 and the pulse signal SYNC-1shot. The output signal SYNC-Off is an output signal from the OFF time detection unit 9, and is a signal outputted at the Hi level during the time from the turning-off of the subordinate switch SW2 until the connection point LX reaches the predetermined threshold value. This signal is supplied to a PMOS transistor Tr3 via an inverter INV2.

As a result, during a time when the output signal SYNC-Off is at the Hi level, the transistor Tr3 keeps ON, and a current supplied from a current source I2 disposed between the transistor Tr3 and a power supply is imparted to the charge signal SYNC-CHG. A capacity C2 is provided between the charge signal SYNC-CHG and the ground GND. Thus, the voltage value of the charge signal SYNC-CHG rises in direct proportion to a time which has elapsed since the transistor Tr3 was turned from OFF to ON, and the value of the current supplied from the current source I2; and in inverse proportion to the capacity value of the capacity C2.

The pulse signal SYNC-1shot representing a one-shot Hi pulse is given to an NMOS transistor Tr4. During a time when the pulse signal SYNC-1shot is at the Hi level, the transistor Tr4 is kept ON, and a current flowed out from a current source I3 disposed between the transistor Tr4 and GND is discharged from the charge voltage SYNC-CHG. That is, the charge voltage SYNC-CHG is controlled in such a manner as to rise in level during a time from the turning-off of the subordinate switch SW2 until the voltage value of the connection point LX reaches the predetermined threshold value, and to fall in level during a prescribed time which occurs immediately after the subordinate switch SW2 is switched from OFF to ON.

The ramp voltage SYNC-RAMP and the charge voltage SYNC-CHG are compared by the comparator CMP, and a stop signal SYNC-Stop representing the results of comparison is imparted to the reset terminal of the SR latch circuit 12. When the level of the ramp voltage SYNC-RAMP is higher, the stop signal SYNC-Stop at the Hi level is outputted to bring the output signal SYNC-DRV of the SR latch circuit 12 to Lo.

The drive signal VG_L of the same logic as the output signal SYNC-DRV is give to the subordinate switch SW2 via the subordinate switch drive unit 4. Thus, at a timing when the ramp voltage SYNC-RAMP>the charge voltage SYNC-CHG, the output signal SYNC-DRV of the arithmetic unit 8 outputs Lo, turning the subordinate switch SW2 off.

Accordingly, the arithmetic unit 8 is configured to output a Hi level to the output signal SYNC-DRV so that the subordinate switch SW2 is turned on at a timing when the main switch SW1 is switched from ON to OFF. Further, the arithmetic unit 8 compares the ramp voltage SYNC-RAMP directly proportional to the time that has elapsed since the turning-on of the subordinate switch SW2, with the charge voltage SYNC-CHG which rises in level in direct proportion to the time from the turning-off of the subordinate switch SW2 until the connection point LX reaches the predetermined threshold value, and which falls in level during the prescribed time since the turning-on of the subordinate switch SW2; and outputs a Lo level to the output signal SYNC-DRV so that the subordinate switch SW2 is turned off at a timing when the level of the ramp voltage SYNC-RAMP becomes high.

The OFF time detection unit 9 detects the time from the turning-off of the subordinate switch SW2 until the connection point LX reaches the predetermined threshold value. The OFF time detection unit 9 accepts the output signal SYNC-DRV, the stop signal SYNC-Stop, and the voltage value at the connection point LX as its inputs, and sends out the output signal SYNC-Off.

Furthermore, the output signal SYNC-DRV and the stop signal SYNC-Stop are subjected to an AND operation in an AND circuit 13, and its output is supplied to a set terminal of an SR latch circuit 14. If the output signal SYNC-DRV is at a Hi level and the stop signal SYNC-Stop is at a Hi level, the Hi level is inputted to the set terminal of the latch circuit 14, and the output signal SYNC-Off of the SR latch circuit 14 is outputted at a Hi level. Voltage information at the connection point LX is supplied to a reset terminal of the SR latch circuit 14. If the connection point LX is at a Hi level, the output signal SYNC-Off is outputted at a Lo level.

When the arithmetic unit 8 controls the subordinate switch SW2 from ON to OFF, the output signal SYNC-DRV is inverted from a Lo level to a Hi level. If the level of the ramp voltage SYNC-RAMP gets higher than the level of the charge voltage SYNC-CHG when the subordinate switch SW2 is ON, the arithmetic unit 8 outputs Hi to the stop signal SYNC-Stop, and outputs Lo to the output signal SYNC-DRV, thereby controlling the subordinate switch SW2 from ON to OFF. Besides, a Hi-level signal is imparted to the set terminal of the SR latch circuit 14 of the OFF time detection unit 9 via the AND logic. Thus, the output signal SYNC-Off is outputted as Hi to the arithmetic unit 8.

When the subordinate switch SW2 is rendered OFF, Lo is outputted as the output signal SYNC-DRV. Thus, a Lo level is given to the set terminal of the SR latch circuit 14. If the connection point LX reaches a Hi level after the subordinate switch SW2 is turned off, the output signal SYNC-Off is inverted from the Hi level to the Lo level.

In the present embodiment, the voltage information at the connection point LX is directly supplied to the reset terminal of the SR latch circuit 14. Thus, the logical threshold of the reset input serves as a predetermined threshold value. If a different threshold value is set, it is suitable that the voltage at the connection point LX and a reference voltage corresponding to the predetermined threshold value be compared by a comparator, and the results of comparison be inputted to the reset.

The correction unit 10, in the present embodiment, makes a correction on the ON time of the subordinate switch SW2, which is determined by the arithmetic unit 8, during a discontinuous current mode. The judgment signal Off-Off provided by the current mode detection unit III is inputted to the correction unit 10 to correct the charge voltage SYNC-CHG. In further detail, the judgment signal Off-Off is a signal turned to Hi when it is detected that the main switch SW1 and the subordinate switch SW2 have been turned off as a result of the action in the discontinuous current mode. A pulse generation section 15 generates the pulse signal OffOff-1shot which is a Hi-pulse signal persisting for a prescribed time, at a timing when the level of the judgment signal Off-Off is turned from Lo to Hi. The pulse signal OffOff-1shot is imparted to an NMOS transistor Tr5, and can keep the transistor Tr5 on during a period when the Hi pulse is generated. A current source I4 is disposed between the transistor Tr5 and the ground GND and, during the ON state of the transistor Tr5, a current flowing out from the current source I4 is discharged from the charge voltage SYNC-CHG. That is, when the main switch SW1 and the subordinate switch SW2 are OFF, the level of the charge voltage SYNC-CHG is lowered for the prescribed period to make the desired correction.

Figure 4:
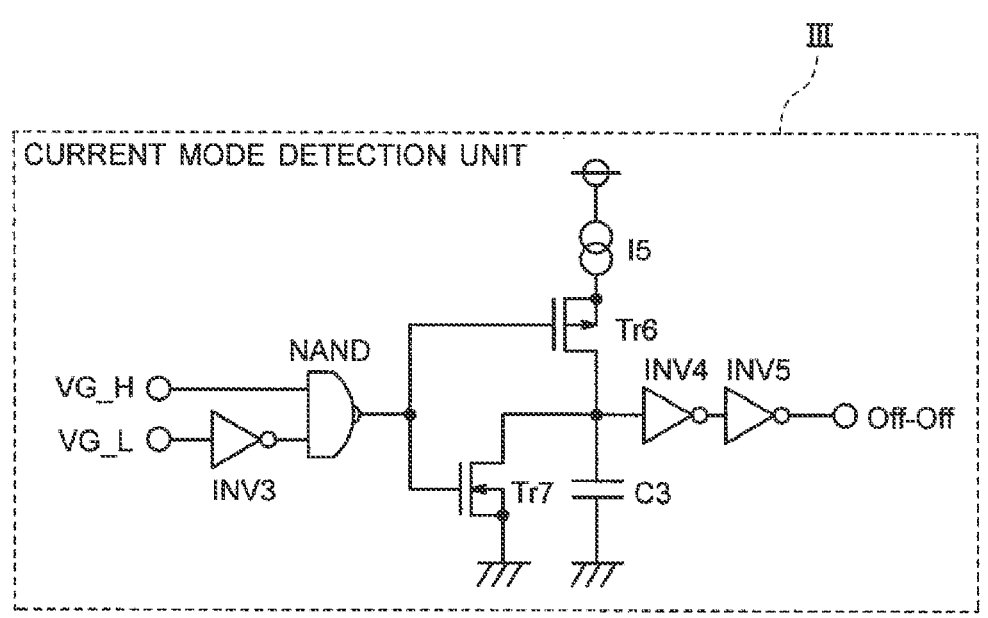
FIG. 4 is a block diagram showing a current mode detection unit of FIG. 1 in an extracted and detailed manner.

FIG. 4 is a block diagram showing the current mode detection unit of FIG. 1 in an extracted and detailed manner. As shown in the drawing, the current mode detection unit III detects that the main switch SW1 and the subordinate switch SW2 have been turned off in the discontinuous current mode. Using the output signal VG_H of the main switch drive unit 3 and the output signa VG_L of the subordinate switch drive unit 4 as inputs, it generates the judgment signal Off-Off.

In further detail, the output signals VG_H and VG_L are logic-processed by an inverter INV3 and a NAND circuit NAND, and imparted, as output signals of the NAND circuit, to a PMOS transistor Tr6 and an NMOS transistor Tr7. The information at the connection point of the transistors Tr6, Tr7 and a capacity C3 is sent out to the correction unit 10 as the judgment signal Off-Off via two inverters INV4 and IVN5 connected in series.

If the main switch SW1 is controlled and driven to ON, while the subordinate switch SW2 is controlled and driven to OFF, the output signal VG_H is given a Lo level, the output signal VG_L is given a Lo level, and the NAND circuit NAND outputs Hi. Thus, the connection point of the transistors Tr6, Tr7 and the capacity C3 is at the same level as the ground GND, so that the judgment signal Off-Off outputs a Lo level.

If the main switch SW1 is controlled and driven to OFF, while the subordinate switch SW2 is controlled and driven to ON, the drive signal VG_H is given a Hi level, the drive signal VG_L is given a Hi level, and the NAND circuit NAND outputs Hi. Thus, the connection point of the transistors Tr6, Tr7 and the capacity C3 is placed at the same level as the ground GND, so that the judgment signal Off-Off outputs a Lo level.

If the main switch SW1 is controlled and driven to OFF, and the subordinate switch SW2 is also controlled and driven to OFF, the drive signal VG_H is given a Hi level, while the drive signal VG_L is given a Lo level. On this occasion, the NAND circuit NAND outputs Lo.

During the discontinuous current mode, a state in which the main switch SW1 is OFF and the subordinate switch SW2 is ON is switched to a state in which the main switch SW1 is OFF and the subordinate switch SW2 is also OFF. Therefore, a state in which the transistor Tr6 is OFF and the transistor Tr7 is ON changes to a state in which the transistor Tr6 is ON and the transistor Tr7 is OFF.

When the transistor Tr6 is turned on and the transistor Tr7 is turned off, a current supplied from a current source I5 is imparted to the connection point of the transistor Tr6, the transistor Tr7 and the capacity C3. When the subordinate switch SW2 is ON, this connection point is placed at the same level as the ground GND. After the subordinate switch SW2 is turned off, the current from the current source I5 begins to be given. In direct proportion to the time during which the subordinate switch SW2 is changed from ON to OFF, therefore, the voltage at the connection point rises from the GND level. If the voltage at the connection point increases above the logical threshold of the inverter INV4 receiving an input from the connection point, the judgment signal Off-Off inverted by the inverter INV5 outputs a Hi level from the Lo level to provide the subordinate switch control unit II with information that the main switch SW1 and the subordinate switch SW2 have been turned off.

Next, the actions of the present embodiment will be described based on the signal waveforms of the respective parts in each mode.

1) In Case No Correction is Made in the Continuous Current Mode

Figure 5:
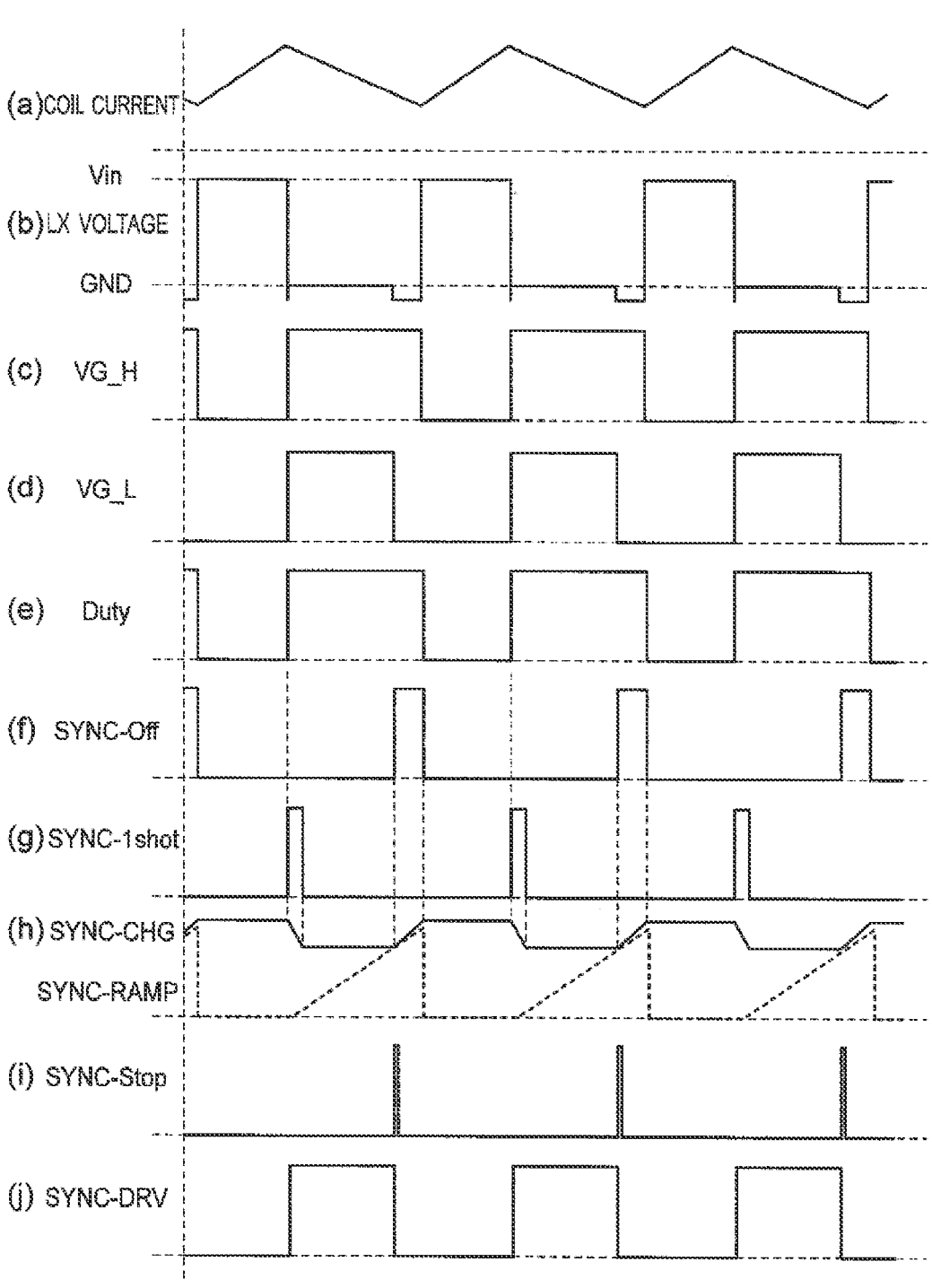
FIGS. 5($a$) to 5($j$) are waveform charts showing the signal waveforms of respective parts in a continuous current mode (not corrected) in the embodiment shown in FIG. 1.

FIGS. 5(*a*) to 5(*j*) are waveform charts showing the signal waveforms of the respective parts in the continuous current mode (without correction) in the embodiment shown in FIG. 1. FIG. 5(*a*) shows the current flowing in the coil L, FIG. 5(*b*) the voltage at the connection point LX, 5(*c*) the drive signal VG_H, FIG. 5(*d*) the drive signal VG_L, FIG. 5(*e*) the output signal Duty, FIG. 5(*f*) the output signal SYNC-Off, FIG. 5(*g*) the pulse signal SYNC-1shot, FIG. 5(*h*) the charge voltage SYNC-CHG and the ramp voltage SYNC-RAMP, FIG. 5(*i*) the stop signal SYNC-Stop, and FIG. 5(*j*) the output signal SYNC-DRV. The symbols concerned with the block configuration of the present embodiment comply with FIGS. 1 to 4 (the same will apply hereinafter).

As shown in FIGS. 5(*a*) to 5(*j*), the continuous current mode in the present embodiment is composed of a phase in which the main switch SW1 (see FIG. 1; the same will apply hereinafter) is turned on to increase the coil current, storing energy in the coil L; and a phase in which the main switch SW1 is turned off to decrease the coil current, delivering the energy stored in the coil to the output.

First, the main switch control unit I monitors the direct current voltage Vout, and determines a period, during which the main switch SW1 is kept ON, in accordance with the difference between the voltage value of the direct current voltage Vout and the set value of the direct current voltage Vout. During the period when the main switch SW1 is ON, the main switch control unit I places the output signal Duty at a Lo level. As a result, the main switch drive unit 3 receives the Lo-level output signal Duty, and outputs the drive signal VG_H, the Lo level signal of the same logic, for transmission to the main switch SW1.

The main switch SW1 is the PMOS transistor, and provided with the direct current voltage Vin at its source and the Lo level from the drive signal VG_H at its gate, thus becoming ON. When the main switch SW1 is ON, the voltage at the connection point LX nearly equals the direct current voltage Vin. At this time, the connection point LX connected to one end of the coil L has the direct current voltage Vin, and the other end of the coil L is at the direct current voltage Vout. Since the converter of the present embodiment is a step-down converter, and Vin>Vout. Thus, the polarity of the current flowing through the coil L is positive in a direction away from the connection point LX toward the output terminal 2, whereby the effect of increasing the positive current is provided.

The output signal Duty at the Lo level is imparted to the arithmetic unit 8 of the subordinate switch control unit II as well. Here, the Lo-level signal is given to the pulse generation section 11 of the arithmetic unit 8. The pulse generation section 11 generates a pulse with the use of a transition from Lo to Hi as a trigger. Thus, during the period in which the output signal Duty is at Lo, no pulse is generated, and a set signal is not given to the set terminal of the SR latch circuit 12. Hence, the output signal SYNC-DRV continues to output the Lo level.

On the other hand, the subordinate switch drive unit 4 imparts the drive signal VG_L of the same logic as the output signal SYNC-DRV to the subordinate switch SW2. Consequently, if the output signal SYNC-DRV is at a Lo level, the drive signal VG_L is also at a Lo level, with the result that the subordinate switch SW2 is rendered OFF.

The main switch control unit I imparts a Lo level during a period determined by the direct current voltage Vout, and then turns the output signal Duty from the Lo level to the Hi level. Provided with such a logic transition of Duty, the main switch drive unit 3 inverts the drive signal VG_H from the Lo level to the Hi level to drive the main switch SW1 from ON to OFF. At this time, the transition of Duty from Lo to Hi is also given to the arithmetic unit 8 of the subordinate switch control unit II. At this timing of transition, the pulse generation section 8 generates the pulse signal SYNC-1shot of a prescribed Hi width. The pulse signal SYNC-1shot is given to the set terminal of the SR latch circuit 12 as a set signal, thereby causing transition of the output signal SYNC-DRV from Lo to Hi. Because of the transition of the output signal SYNC-DRV, the drive signal VG_L also undergoes transition from Lo to Hi, turning the subordinate switch SW2 from OFF to ON.

When the subordinate switch SW2 is turned on, the voltage at the connection point LX is nearly equal to the voltage at the ground GND. At this time, one end of the coil L is connected to the connection point LX, and brought to the potential of the ground GND. The other end of the coil L is connected to the output terminal 2. Thus, the positive coil current is decreased.

The transition of the output signal Duty from Lo to Hi, as noted above, results in the controlling and driving of the main switch SW1 from ON to OFF and the subordinate switch SW2 from OFF to ON. If the ON-period of the main switch SW1 and the ON-period of the subordinate switch SW2 overlap, however, a path starting from the direct current power source and arriving at the ground GND by way of the main switch SW1 and the subordinate switch SW2 is formed. Thus, an overcurrent flows, and is liable to damage the current path. To prevent such an overcurrent, it is a general measure to provide a slight period, during which the main switch SW1 is OFF and the subordinate switch SW2 is OFF, between a timing when the main switch SW1 is turned from ON to OFF, and a timing when the subordinate switch SW2 is turned from OFF to ON. In such a period during which the main switch SW1 is OFF and the subordinate switch SW2 is also OFF, the parasitic diode of the subordinate switch SW2 serves as the path for the flow of the coil current. Thus, the voltage at the connection point LX becomes negative during a slight period of transition from the state in which the main switch SW1 is turned on and the voltage at the connection point LX is rendered nearly equal to the direct current voltage Vin, to the state in which the subordinate switch SW2 is turned on and the voltage at the connection point LX is rendered nearly equal to the voltage of the ground GND.

The pulse signal SYNC-1shot is also given to the NMOS transistor Tr4 of the arithmetic unit 8, and the transistor Tr4 remains ON during the period in which the pulse generation section 11 of the arithmetic unit 8 outputs a Hi pulse to the pulse signal SYNC-1shot. The current source I3 is disposed between the transistor Tr4 and the ground GND and, during the Hi state of the pulse signal SYNC-1shot, the charge of the capacity C2 disposed between the charge voltage SYNC-CHG and the ground GND is discharged. At this time, Hi pulses given to the transistor Tr4 have a prescribed width, so that the amount of a voltage drop in the charge voltage SYNC-CHG is a constant value. Accordingly, at a timing when the output signal Duty transitions from the Lo level to the Hi level, the voltage of the charge signal SYNC-CHG declines by a constant amount.

The output signal Duty is also given to the inverter INV1 of the arithmetic unit 8, and the output of the inverter INV1 is given to the PMOS transistor Tr1 and the NMOS transistor Tr2. During the OFF period of the subordinate switch SW2, the output signal Duty is Lo. Thus, the transistor Tr1 is OFF, while the transistor Tr2 is ON, and the ramp voltage SYNC-RAMP is placed at the ground GND. If, in this state, the output signal Duty becomes Hi, then the subordinate switch SW2 is turned to ON, the transistor Tr1 is brought to ON, and the transistor Tr2 is rendered OFF.

The current source I1 is disposed between the transistor Tr1 and the power source of the arithmetic unit 8. During the ON period of the transistor Tr1, the capacity C1 disposed between the ramp voltage SYNC-RAMP and the ground GND begins to be charged at a predetermined current value. Thus, the ramp voltage SYNC-RAMP is at the level of the ground GND during the OFF period of the subordinate switch SW2. At a timing when the subordinate switch SW2 changes from OFF to ON, a rise in its voltage begins, and in direct proportion to the ON time of the subordinate switch SW2, its voltage keeps rising.

The ramp voltage SYNC-RAMP and the charge voltage SYNC-CHG are compared by the comparator CMP of the arithmetic unit 8. If the voltage value of the ramp voltage SYNC-RAMP is higher, the stop signal SYNC-Stop, the comparator output, outputs a Hi level. At a point in time when the voltage value of the charge voltage SYNC-CHG becomes higher, the stop signal SYNC-Stop comes to a Lo level.

In case the subordinate switch SW2 is OFF, the ramp voltage SYNC-RAMP is at the level of the ground GND, so that the stop signal SYNC-Stop is at a Lo output. When the subordinate switch SW2 is turned from OFF to ON, the voltage value of the ramp voltage SYNC-RAMP begins to rise. If it becomes higher than the voltage value of the charge voltage SYNC-CHG, the stop signal SYNC-Stop outputs Hi.

The stop signal SYNC-Stop is given as a reset signal to the reset terminal of the SR latch circuit 12 and, when the stop signal SYNC-Stop becomes Hi, the output signal SYNC-DRV transitions from Hi to Lo. According to the transition of the output signal SYNC-DRV, the drive signal VG_L also transitions from Hi to Lo, thus switching the subordinate switch SW2 from ON to OFF. Immediately after the switching of the subordinate switch SW2 to OFF, the output signal Duty is at a Hi level. Thus, the drive signal VG_H is also Hi, bringing the main switch SW1 to OFF.

This period is also a period during which the main switch SW1 is OFF and the subordinate switch SW2 is also OFF. Thus, the parasitic diode of the subordinate switch SW2 serves as the path for the flow of the coil current, and the voltage at the connection point LX becomes negative.

The stop signal SYNC-Stop is given to the AND circuit 13 of the OFF time detection unit 9 as well. While the subordinate switch SW2 is being ON, Hi is outputted to the output signal SYNC-DRV. When Hi is outputted to SYNC-Stop, therefore, the AND output of the AND circuit 13 is also turned to Hi, and a set signal is given to the set terminal of the SR latch circuit 14. As a result, the SR latch circuit 14 achieves the transition of the output signal SYNC-Off from Lo to Hi. When the output signal SYNC-Off changes from Lo to Hi, Lo is given to the PMOS transistor Tr3 via the inverter INV2, with the result that the transistor Tr3 is turned from OFF to ON.

The current source I2 is disposed between the transistor Tr3 and the power source of the arithmetic unit 8. When the transistor Tr3 is turned on, the capacity C2 disposed between the charge voltage SYNC-CHG and the ground GND begins to be charged at a predetermined current value. Afterwards, a next switching cycle is started. When the main switch control unit I outputs Lo to the output signal Duty, the main switch drive unit 3 outputs Lo as the drive signal VG_H, driving the main switch SW1 from OFF to ON. As a result, the voltage at the connection point LX virtually equals the direct current voltage Vin. Simultaneously with the turning-on of the main switch SW1, the voltage at the connection point LX transitions from the negative voltage to the direct current voltage Vin. The voltage at the connection point LX is also inputted to the reset terminal of the SR latch circuit 14 of the OFF time detection unit 9, so that the transition of the potential of the connection point LX resets the SR latch circuit 14. As a result, the output signal SYNC-Off changes from Hi to Lo, turning the transistor Tr3 off. As noted here, the charge voltage SYNC-CHG decreases by a constant voltage immediately after the subordinate switch SW2 is turned on. In direct proportion to the period from the turning-off of the subordinate switch SW2, followed by the starting of a next switching cycle, until the main switch SW1 is turned on, the charge voltage SYNC-CHG rises in voltage.

During the period from the turning-off of the subordinate switch SW2 until the starting of the next cycle, the coil current passes through the parasitic diode of the subordinate switch SW2. During this period, therefore, a power loss is greater than during the period when the coil current passes through the subordinate switch SW2 in the ON state. Thus, the period from the turning-off of the subordinate switch SW2 until the starting of the next cycle should desirably be as short as possible.

If the next cycle starts, with the subordinate switch SW2 remaining ON, and the main switch SW1 is turned on, on the other hand, an over current flows from the input terminal 1 to the ground GND, potentially damaging the switch. Before the next cycle is started, therefore, the subordinate switch SW2 needs to be turned off reliably. For example, if the ON time of the subordinate switch SW2 in a certain cycle is shorter than an expected value under the influence of external disturbance or the like, the period from the turning-off of the subordinate switch SW2 until the start of the next cycle is longer than the expected value. Thus, the amount of a rise in voltage of the charge voltage SYNC-CHG in this cycle is large. In this case, the charge voltage SYNC-CHG at the start of the next cycle is higher than in this cycle. Hence, the period from the turning-on of the subordinate switch SW2 until a timing when the ramp voltage SYNC-RAMP becomes higher than the charge voltage SYNC-CHG is longer in the next cycle than in this cycle. Accordingly, in the next cycle, the effect of making the ON time of the subordinate switch SW2 longer than in this cycle works.

Likewise, in case the ON time of the subordinate switch SW2 is longer than the expected value, the period from the turning-off of the subordinate switch SW2 until the start of the next cycle is shorter than the expected value. Thus, the amount of a rise in voltage of the charge voltage SYNC-CHG in this cycle is small. In this case, the charge voltage SYNC-CHG at the start of the next cycle is lower than in this cycle. Hence, the period from the turning-on of the subordinate switch SW2 until a timing when the ramp voltage SYNC-RAMP becomes higher than the charge voltage SYNC-CHG is shorter in the next cycle than in this cycle. In the next cycle, therefore, the effect of making the ON time of the subordinate switch SW2 shorter than in this cycle works.

2) In Case Correction is Made in the Discontinuous Current Mode

Figure 6:
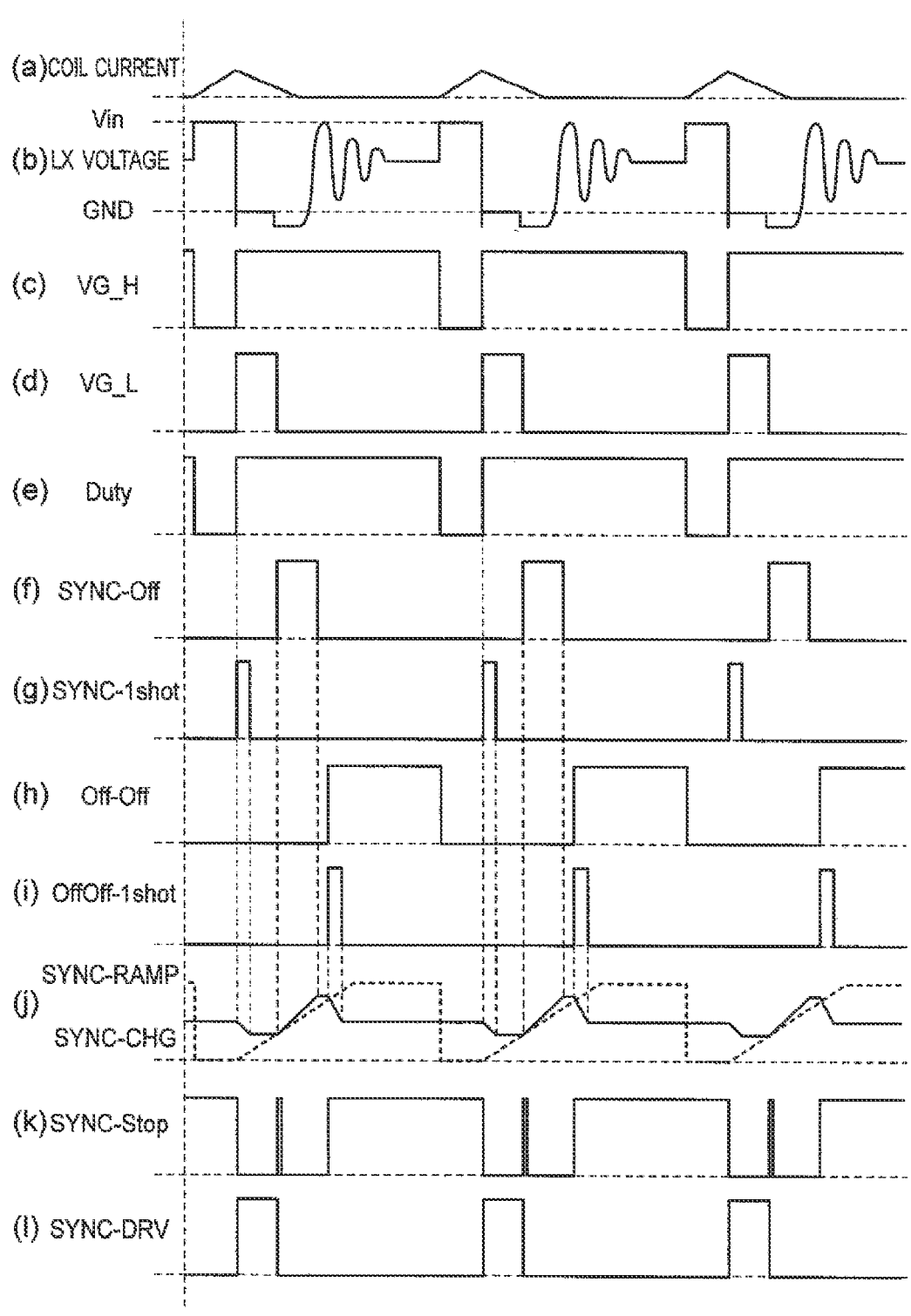
FIGS. 6($a$) to 6($l$) are waveform charts showing the signal waveforms of the respective parts in a discontinuous current mode (corrected) in the embodiment shown in FIG. 1.

FIGS. 6(a) to 6(l) are waveform charts showing the signal waveforms of the respective parts in the discontinuous current mode (with corrections) in the embodiment shown in FIG. 1. FIGS. 6(a) to 6(g) correspond to FIGS. 5(a) to 5(g). Since the present embodiment has a correction function, the waveforms of the judgment signal Off-Off (h) and the pulse signal OffOff-1shot (i) corresponding to this function are added. FIGS. 6(j) to 6(l) correspond to FIGS. 5(h) to 5(j), respectively.

As shown in FIGS. 6(a) to 6(l), the discontinuous current mode comprises a phase in which the main switch is turned on to increase the coil current, storing energy in the coil; a phase in which the main switch is turned off to decrease the coil current, delivering the energy stored in the coil to the output; and a phase in which the main switch and the subordinate switch are turned off to eliminate acceptance and delivery of energy via the coil.

In the discontinuous current mode, like the continuous current mode, the main switch control unit I determines the period, during which the main switch SW1 is kept ON, and during this period, sets the output signal Duty at a Lo level. When the main switch SW1 is turned on, the connection point LX is brought to a value nearly equal to the direct current voltage Vin, the voltage of the input terminal 1. Thus, the current flowing into the coil L increases in a positive value. Afterwards, the waveforms of the respective parts exhibit the same behaviors as those in the continuous current mode until the value of the ramp voltage SYNC-RAMP gets higher than the value of the charge voltage SYNC-CHG and Hi is outputted to the stop signal SYNC-Stop.

When the stop signal SYNC-Stop gets Hi, the subordinate switch SW2 is controlled and driven from ON to OFF. In the case of the continuous current mode, after the period of the turning-off of the main switch SW1 and the subordinate switch SW2 controlled by the arithmetic unit 8, the next cycle is started. In the case of the discontinuous current mode, on the other hand, the period of the turning-off of the main switch SW1 and the subordinate switch SW2 controlled by the arithmetic unit 8 is followed by the period of the turning-off of the main switch SW1 and the subordinate switch SW2 not controlled by the arithmetic unit 8. This OFF period not controlled by the arithmetic unit 8 depends on the heaviness or lightness of the load connected between the direct current voltage Vout and the ground GND. If the load is light, this period is long, but if the load is heavy, this period is short.

Here, the OFF period controlled by the arithmetic unit 8 is a period during which the output signal SYNC-Off remains Hi. The OFF period not controlled by the arithmetic unit 8 is a period from the transition of the output signal SYNC-Off from Hi to Lo until Duty transitions from Hi to Lo in the next cycle.

During the discontinuous current mode, the correction unit 10 performs a correction on the voltage level of the charge voltage SYNC-CHG. That is, when the stop signal SYNC-Stop changes from Lo to Hi, a set signal is given to the set terminal of the SR latch circuit 14 of the OFF time detection unit 9, thus switching the output signal SYNC-Off from Lo to Hi. As a result, the transistor Tr3 of the arithmetic unit 8 is turned from OFF to ON, so that the current source I2 starts charging of the capacity C2.

When the stop signal SYNC-Stop becomes Hi, the output signal SYNC-DRV becomes Lo, and the drive signal VG_L also turns to Lo, thus turning the subordinate switch SW2 off. Previously, starting at a time when the subordinate switch SW2 is ON, the coil current gradually decreases in the positive component. Even after the subordinate switch SW2 is turned off, the voltage at the connection point LX connected to the one end of the coil L is negative, while the voltage at the other end of the coil L is the direct current voltage Vout. Thus, the current in the positive direction continues to decrease gradually.

Owing to the above effects, when the coil current decreases and finally comes to zero, parasitic capacity components present at the drain terminals of the main switch SW1 and the subordinate switch SW2, and the coil L produce a resonant voltage waveform at the connection point LX. Because of this resonance phenomenon, a reset input is given to the reset terminal of the SR latch circuit 14 of the OFF time detection unit 9. Consequently, the output signal SYNC-Off transitions from Hi to Lo. In accordance with this transition, the charging of the capacity C2 by the current source I2 comes to an end, and the rise in the voltage of the charge voltage SYNC-CHG also ends.

It is the judgment signal Off-Off, the output signal of the current mode detection unit III, that controls the presence or absence of the execution of correction. The current mode detection unit III receives the drive signal VG_H and the drive signal VG_L. If the drive signal VG_H is Hi and the main switch SW1 is OFF, and the drive signal VG_L is Lo and the subordinate switch SW2 is also OFF, then the output of the NAND circuit NAND is Lo. As a result, the transistor Tr6 is turned on, while the transistor Tr7 is turned off. Thus, the current source I5 starts charging the capacity C3. Charging of the capacity C3 starts at a timing when the subordinate switch SW2 changes from ON to OFF, i.e., a timing when the stop signal SYNC-Stop transitions from Lo to Hi.

Prior to the start of charging, the transistor Tr7 of the current mode detection unit III is ON. Thus, the connection point of the transistors Tr6, Tr7 and the capacity C3 is at the potential of the ground GND. Upon start of the charging, the voltage at the connection point rises. If the voltage at the connection point exceeds the logical threshold of the inverter INV4 being inputted, the judgment signal Off-Off inverted by INV5 changes from Lo to Hi.

The judgment signal Off-Off is given to the correction unit 10 of the subordinate switch control unit II and, at a timing when the judgment signal Off-Off transitions from Lo to Hi, the pulse signal OffOff-1shot of a prescribed Hi width is generated. The pulse signal OffOff-1shot is given to the transistor Tr5 of the correction unit 10, and the current source I4 is disposed between the transistor Tr5 and the ground GND. Thus, during the period corresponding to the prescribed Hi width in the pulse signal OffOff-1shot, the charge of the capacity C2 is discharged. Thus, when a predetermined time has elapsed since the turning-off of the main switch SW1 and the subordinate switch SW2, the voltage of SYNC-CHG is lowered by a constant amount.

In order to add a correction in the discontinuous current mode, it is preferred that the time from the turning-off of the main switch and the subordinate switch until Off-Off goes to Hi be set to be longer than the OFF time controlled by the arithmetic unit 8.

Hereinbelow, the prior art disclosed in JP 4674661 or the like and the embodiment of the present invention will be compared. The functions in the prior art and the present embodiment in the continuous current mode are the same. Thus, the waveform charts showing the waveforms of the respective parts in this case are also the same.

Figure 7:
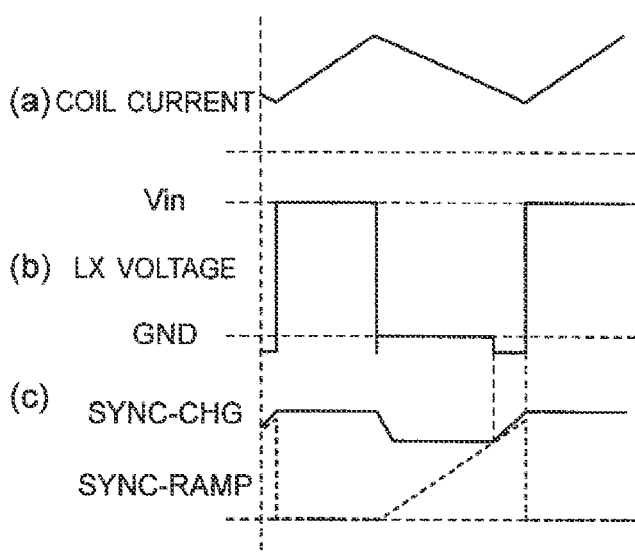
FIGS. 7($a$) to 7($c$) are waveform charts showing the signal waveforms of respective parts in a continuous current mode in the prior art and the embodiment shown in FIG. 1.

The common functions in the continuous current mode will be described based on FIGS. 7(a) to 7(c). FIG. 7(a) shows the waveform of the coil current, FIG. 7(b) shows the waveform of the voltage at the connection point LX, and FIG. 7(c) shows the waveforms of the ramp voltage SYNC-RAMP and the charge voltage SYNC-CHG serving as inputs to the comparator CMP. As shown in FIG. 7(a), the coil current has a waveform continuous in the positive region. As shown in FIG. 7(b), the voltage at the connection point LX transitions from the negative to the direct current voltage Vin of the input terminal 1 nearly vertically, because a transition occurs from a state, where the main and subordinate switches SW1, SW2 are OFF and the voltage at the connection point LX is negative, to the ON state of the main switch SW1 in the next cycle.

Figure 8A:
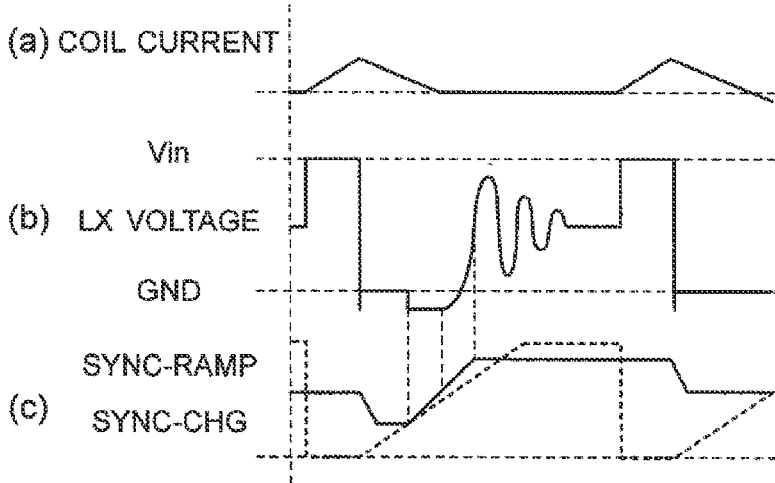
FIGS. 8A(a) to (c), 8B(a) to (c) are waveform charts showing the signal waveforms of the respective parts for comparing functions in a discontinuous current mode in the prior art (FIGS. 8A(a) to (c)) and the embodiment shown in FIG. 1 (FIGS. 8B(a) to (c)).

In the case of the discontinuous current mode, on the other hand, according to the prior art, as shown in FIGS. 8A(a) to 8A(c), after the main and subordinate switches SW1, SW2 are turned off, the voltage at the connection point LX rises somewhat gently due to the resonance of the coil L and the parasitic capacity added to the connection point LX. Thus, a period from a point in time, when the voltage at the connection point LX is negative, until it reaches a predetermined threshold value (this threshold value is, in the present embodiment, the logical threshold of the reset of the SR latch circuit 14 of the OFF time detection unit 9, and is set, for example, at ½ of the direct current voltage Vin of the input terminal 1) is longer than in the case of the continuous current mode.

As a result, in the discontinuous current mode according to the prior art, the charge voltage SYNC-CHG in a next switching cycle with respect to a certain switching cycle becomes high. In the cycle in which the charge voltage SYNC-CHG is even higher, the ON time of the subordinate switch SW2 also lengthens. Thus, a case where the coil current reaches a negative value occurs.

Figure 8B:
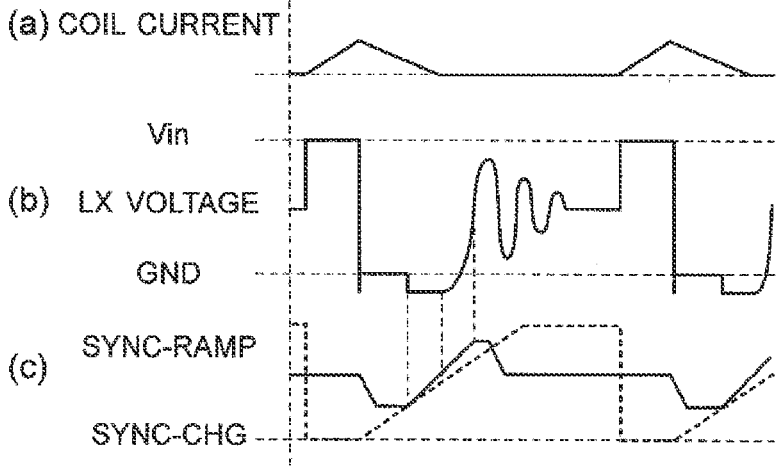

In the case of the discontinuous current mode, on the other hand, according to the present embodiment, as shown in FIGS. 8B(a) to 8B(c), after the main and subordinate switches SW1, SW2 are turned off, the voltage at the connection point LX rises somewhat gently due to the resonance of the coil L and the parasitic capacity added to the connection point LX. Thus, a period from a point in time, when the voltage at the connection point LX is negative, until it reaches the predetermined threshold value is longer than in the continuous current mode, as according to the prior art.

In the case of the present embodiment, however, the period until the threshold value is reached is corrected appropriately by the correction unit 10, so that the problem as in the prior art does not occur. That is, according to the present embodiment, when a predetermined time has elapsed since the main and subordinate switches SW1, SW2 were turned off, the current mode detection unit III detects the discontinuous current mode, and outputs the judgment signal Off-Off to the correction unit 10 of the subordinate switch control unit II. Upon reception of the judgment signal Off-Off, the correction unit 10 performs a correction to lower the charge voltage SYNC-CHG by the constant amount.

Such a correction eliminates the difference between the vertical transition of the voltage at the connection point during the continuous current mode and the gentle voltage rise ascribed to resonance during the discontinuous current mode. Even in the discontinuous current mode, therefore, the difference in the level of the charge voltage SYNC-CHG in each switching cycle can be eliminated. That is, since there is no difference in each cycle between the ON times of the main and subordinate switches SW1 and SW2, the coil current does not fall to the negative.

The arithmetic unit 8 in the foregoing embodiment compares the charge signal SYNC-CHG, which rises in voltage value depending on a time from the turning-off of the subordinate switch SW2 until the connection point LX reaches the predetermined threshold value and which falls by the constant amount in each cycle, with the ramp signal SYNC-RAMP which rises in value depending on the ON time of the subordinate switch SW2; and determines the ON time of the subordinate switch SW2 (a configuration described herein). However, this is not limitative, and the following are also included in the technical ideas of the present invention: 1) Control is exercised based on the voltage which rises depending on the time from the turning-off of the subordinate switch SW2 until the connection point LX reaches the predetermined threshold value (see SYNC-CHG) (a configuration described herein). 2) Control is exercised based on the voltage which rises depending on the time (see SYNC-CHG) and the voltage decreased by the constant amount via the transistor Tr4 (a configuration described herein).

The configuration 1) above has, among the components shown in FIG. 3, the pulse generation section 11, the SR latch circuits 12, 14, the comparator CMP, the current source I2, the transistor Tr3, the capacity C2, the inverter circuit INV2, and the AND circuit 13. In this configuration, the charge signal SYNC-CHG, which rises depending on the time from the turning-off of the subordinate switch SW2 until the connection point LX reaches the predetermined threshold value, is compared with a reference voltage, e.g., a predetermined standard value, by the comparator CMP and, based on the results of comparison, the ON time of the subordinate switch SW2 is determined.

The configuration 2) above has, among the components shown in FIG. 3, the pulse generation section 11, the SR latch circuits 12, 14, the comparator CMP, the current sources I2, I3, the transistors Tr3, Tr4, the capacity C2, the inverter circuit INV2, and the AND circuit 13. In this configuration, the charge signal SYNC-CHG, which rises depending on the time from the turning-off of the subordinate switch SW2 until the connection point LX reaches the predetermined threshold value, and which is generated by the transistor Tr4 controlled to ON or OFF by the one-shot pulse signal SYNC-1shot, is compared with the reference voltage, e.g., the predetermined standard value, by the comparator CMP and, based on the results of comparison, the ON time of the subordinate switch SW2 is determined.

In the case of 1), moreover, the same predetermined control is possible using "the voltage falling" as well as "the voltage rising". Similarly, in the case of 2) as well, the voltage varying with time may be "the voltage falling", and the voltage changing in each cycle may be "the voltage rising by a constant amount".

Likewise, in the case of the arithmetic unit 8 shown in FIG. 3, "the voltage rising" can be substituted by the voltage falling, and "the voltage falling" can be substituted by the voltage rising. In short, in the case of FIG. 3, control may be exercised such that the value of the voltage, which varies in one direction so as to rise or fall depending on the time from the turning-off of the subordinate switch until the voltage value at the connection point LX reaches the threshold value, and which varies in the reverse direction so as to fall or rise by the constant amount in each cycle, is compared with the value of the voltage which varies in the one direction so as to rise or fall depending on the ON time of the subordinate switch SW2.

In the above embodiment, the correction unit 10 is configured to perform a correction by increasing the voltage value which falls in each cycle. However, this is not limiting. The same effects can be obtained, even by configuring the correction unit 10 to perform a correction by decreasing the rise rate of the voltage which rises depending on the time from the turning-off of the subordinate switch SW2 until the voltage at the connection point LX reaches the threshold value.

Figure 9:
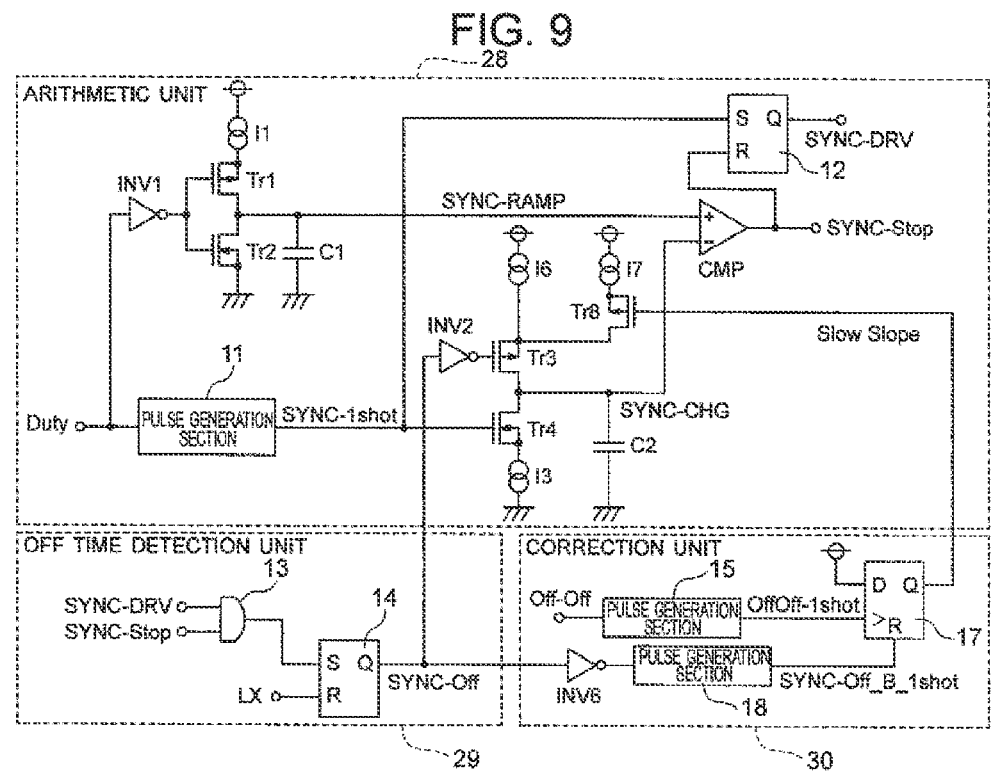
FIG. 9 is a block diagram showing another configuration example in which the configuration of the subordinate switch control unit is different in the above embodiment.

FIG. 9 is a block diagram showing the configuration example of the subordinate switch control unit which performs a correction by decreasing the rise rate of the voltage which rises depending on the time until the voltage at the connection point LX reaches the threshold value. The same parts as those in FIG. 3 are assigned the same numerals, and duplicate explanations are omitted.

As shown in FIG. 9, a correction unit 30 of the present example is provided with a judgment signal Off-Off by a current mode detection unit III (see FIG. 1; the same applies hereinafter). If a discontinuous current mode is detected, the judgment signal Off-Off changes from a Lo level to a Hi level. When the judgment signal Off-Off changes from Lo to Hi, a pulse generation section 15 of the correction unit 30 outputs a pulse signal OffOff-1shot which remains at a Hi level for a predetermined period. This pulse signal OffOff-1shot is given to a clock input terminal of a D flip-flop circuit 17 having a D terminal connected to a power source, whereupon an output signal SlowSlope outputted from a Q terminal of the D flip-flop circuit 17 is turned to a Hi level.

The output signal SlowSlope is given to a gate of a PMOS transistor Tr8 of an arithmetic unit 28. When the output signal SlowSlope is Hi, therefore, the transistor Tr8 is turned off. A current source I7 is disposed between a source of the transistor Tr8 and a power source and, while the output signal SlowSlope is being Hi, an output current of the current source I7 is shut off by the transistor Tr8.

On the other hand, while an output signal SYNC-Off of an OFF time detection unit 29 is remaining Hi, a transistor Tr3 is ON to supply a current to a capacity C2. As a result, a voltage based on the charge of the capacity C2 rises in direct proportion to the period of the Hi level. A current supplied at this time is given by current sources I6, I7 such that the sum of a current value supplied from the current source I6 and a current value supplied from the current source I7 is rendered equal to the current value supplied from the current source I2 of FIG. 3.

Consequently, when the output signal SlowSlope from the correction unit 30 is Hi, the transistor Tr8 is OFF. Thus, the current serving as the charge signal SYNC-CHG is supplied only from the current source I6. The amount of the current supplied from the current source I6 is smaller than the amount of supply from the current source I2 shown in FIG. 3. Thus, the voltage rise rate of the charge signal SYNC-CHG is lower than in the embodiment shown in FIG. 3.

In the correction unit 30 in the present example, the judgment signal SYNC-Off outputted from the OFF time detection unit 29 is inverted by an inverter 6, and supplied to a pulse generation section 18. The resulting pulse signal SYNC-Off_B_1shot is supplied to a reset terminal of the D flip-flop circuit 17 to reset the D flip-flop circuit 17.

Figure 10:
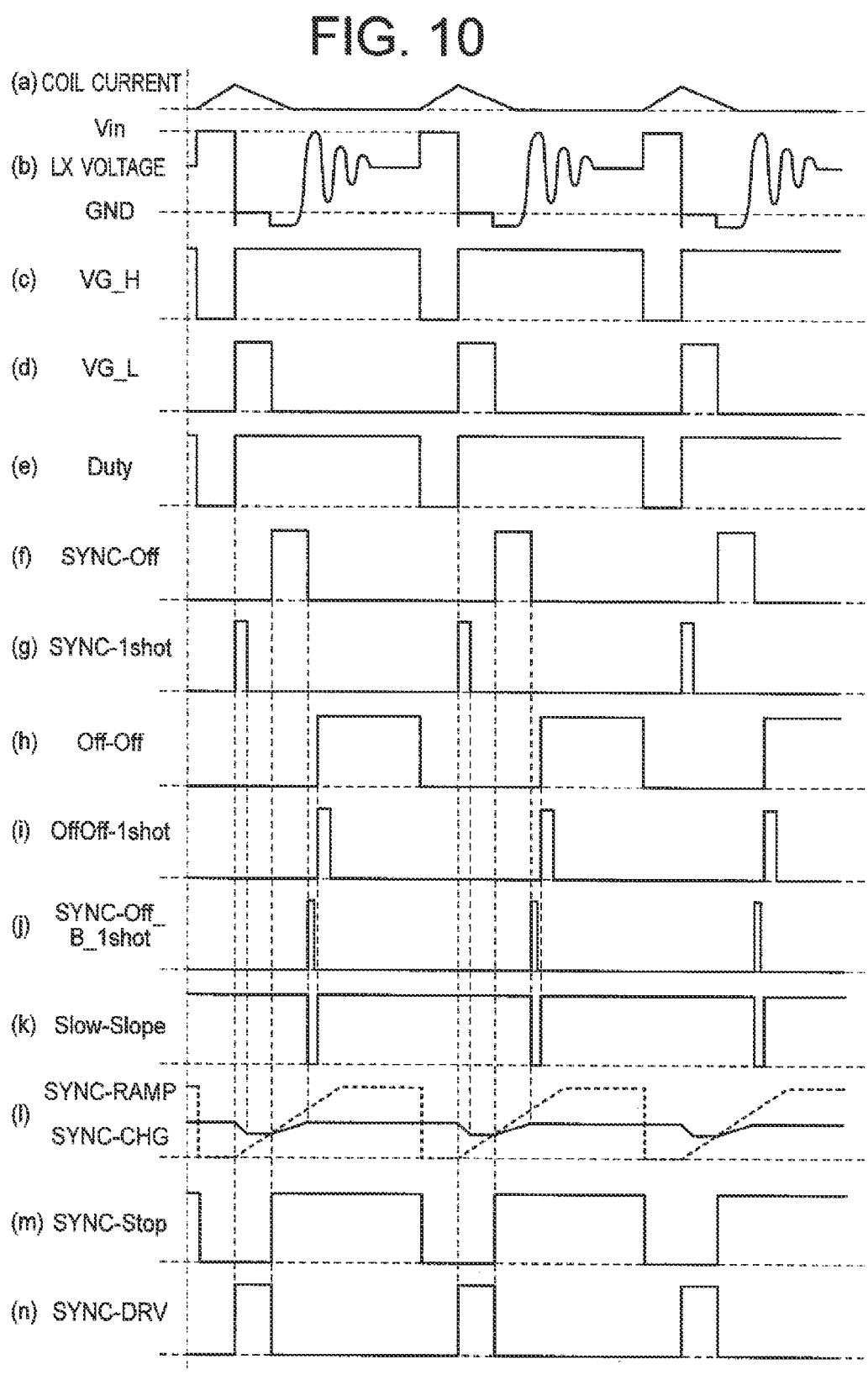
FIGS. 10($a$) to 10($n$) are waveform charts showing the waveforms of the respective parts in a discontinuous current mode in the example shown in FIG. 9.

The waveforms of the respective parts in the discontinuous current mode in the example shown in FIG. 9 are shown in FIGS. 10(a) to 10(m). By reference to these drawings, the voltage rise rate of the charge signal SYNC-CHG is low in the waveform shown in FIG. 10(l).

Figure 11:
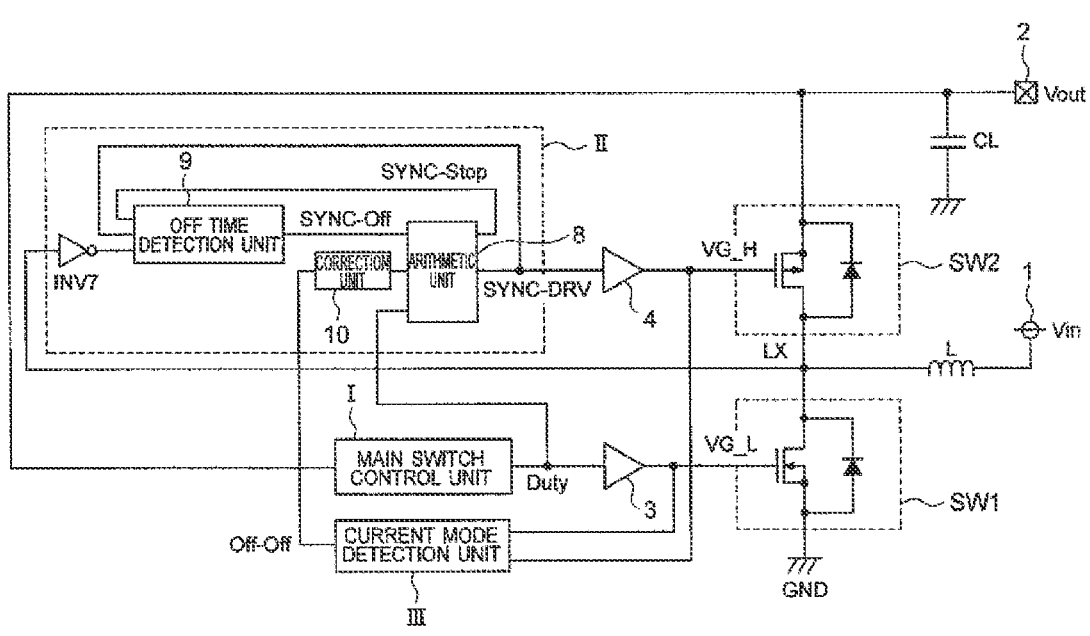
FIG. 11 is a block diagram showing the whole of a step-up DC/DC converter according to another embodiment of the present invention.

FIG. 11 is a block diagram showing the whole of a step-up DC/DC converter according to another embodiment of the present invention. As shown in this drawing, the step-up DC/DC converter according to the present embodiment is of a step-up type. Thus, with respect to the step-down type shown in FIG. 1, the direction of a coil current flowing through a coil L is reverse (a direction toward a connection point LX) and, at the same time, the relationship between a main switch SW1 and a subordinate switch SW2 is inverse. That is, the main switch SW1 is composed of an NMOS transistor of the same type as the subordinate switch SW2 of FIG. 1, whereas the subordinate switch SW2 is composed of a PMOS transistor of the same type as the main switch SW1 of FIG. 1. A drive signal VG_L represents switching pulses of the same waveform as the drive signal VG_L of FIG. 1, while a drive signal VG_H represents switching pulses of the same waveform as the drive signal VG_H of FIG. 1. An OFF time detection unit 9 is supplied with a signal from the connection point LX inverted by an inverter INV7. Other features are the same as those in FIG. 1. Thus, the same parts are assigned the same numerals, and duplicate explanations are omitted.

EXPLANATIONS OF LETTERS OR NUMERALS

I Main switch control unit
II Subordinate switch control unit
III Current mode detection unit
Vin Direct current voltage
Vout Direct current voltage
SW1 Main switch
SW2 Subordinate switch
1 Input terminal
2 Output terminal
3 Main switch drive unit
4 Subordinate switch drive unit
8, 28 Arithmetic unit
9, 29 OFF time detection unit
10, 30 Correction unit

The invention claimed is:

1. A DC/DC converter which has a coil connected to a connection point between two switching means that are connected in series; uses, as a main switching means, one switching means of the two switching means that is being turned on when energy is stored in the coil, and uses, as a subordinate switching means, another switching means of the two switching means that is being turned on when the energy stored in the coil is sent out to an output side; and performs a switching action for alternately turning on/off the main switching means and the subordinate switching means, thereby converting a direct current input voltage into a predetermined direct current output voltage, the DC/DC converter, comprising:

a current mode detection means for detecting either a continuous current mode in which a current flowing through the coil does not reach zero, or a discontinuous current mode in which the current flowing through the coil reaches zero, when the main switching means is turned OFF; and a subordinate switch control means for controlling an ON time of the subordinate switching means in a next or later cycle, based on a time from turning-off of the subordinate switching means until a voltage at the connection point reaches a predetermined threshold value lying within a range between a minimum value and a maximum value of the voltage, wherein if the discontinuous current mode is detected based on results of detection by the current mode detection means, the subordinate switch control means performs a correction on the controlled ON time of the subordinate switching means in the next or later cycle, wherein the subordinate switch control means exercises control based on a value of a voltage which varies in one direction so as to rise or fall depending on the time from the turning-off of the subordinate switching means until the voltage at the connection point reaches the predetermined threshold value, and which falls or rises by a constant amount in a direction opposite to the direction of varying so as to rise or fall similarly in each cycle, and wherein the subordinate switch control means compares the value of the voltage which varies in one direction so as to rise or fall depending on the time from the turning-off of the subordinate switching means until the voltage at the connection point reaches the predetermined threshold value, and which falls or rises by a constant amount in the direction opposite to the direction of varying so as to rise or fall similarly in each cycle, with a value of a voltage varying in the one direction by rising or falling in value depending on the ON time of the subordinate switching means, to exercise control.

2. The DC/DC converter according to claim 1, wherein the subordinate switch control means is adapted to control the ON time of the subordinate switching means in the next or later cycle so that a polarity of the current flowing through the coil is not reversed.

3. The DC/DC converter according to claim 1, wherein the subordinate switch control means decreases a rise rate of the voltage, which rises depending on the time from the turning-off of the subordinate switching means until the voltage at the connection point reaches the predetermined threshold value, thereby performing the correction.

4. The DC/DC converter according to claim 1, wherein the subordinate switch control means increases the value of the voltage, which falls in each cycle, thereby performing the correction.

5. A DC/DC converter which has a coil connected to a connection point between two switches that are connected in series; uses, as a main switch, one switch of the two switches that is being turned on when energy is stored in the coil, and uses, as a subordinate switch, another switch of the two switches that is being turned on when the energy stored in the coil is sent out to an output side; and performs a switching action for alternately turning on/off the main switch and the subordinate switch, thereby converting a direct current input voltage into a predetermined direct current output voltage, the DC/DC converter, comprising:

a current mode detection unit configured to detect either a continuous current mode in which a current flowing through the coil does not reach zero, or a discontinuous current mode in which the current flowing through the coil reaches zero, when the main switch is turned OFF; and a subordinate switch control unit configured to control an ON time of the subordinate switch in a next or later cycle, based on a time from turning-off of the subordinate switch until a voltage at the connection point reaches a predetermined threshold value lying within a range between a minimum value and a maximum value of the voltage, wherein if the discontinuous current mode is detected based on results of detection by the current mode detection unit, the subordinate switch control unit performs a correction on the controlled ON time of the subordinate switch in the next or later cycle, wherein the subordinate switch control unit exercises control based on a value of a voltage which varies in one direction so as to rise or fall depending on the time from the turning-off of the subordinate switch until the voltage at the connection point reaches the predetermined threshold value, and which falls or rises by a constant amount in a direction opposite to the direction of varying so as to rise or fall similarly in each cycle, and wherein the subordinate switch control unit compares the value of the voltage which varies in one direction so as to rise or fall depending on the time from the turning-off of the subordinate switch until the voltage at the connection point reaches the predetermined threshold value, and which falls or rises by the constant amount in the direction opposite to the direction of varying so as to rise or fall similarly in each cycle, with a value of a voltage varying in the one direction by rising or falling in value depending on the ON time of the subordinate switch, to exercise control.

6. The DC/DC converter according to claim 5, wherein the subordinate switch control unit is adapted to control the ON time of the subordinate switch in the next or later cycle so that a polarity of the current flowing through the coil is not reversed.

7. The DC/DC converter according to claim 5, wherein the subordinate switch control unit decreases a rise rate of the voltage, which rises depending on the time from the turning-off of the subordinate switch until the voltage at the connection point reaches the predetermined threshold value, thereby performing the correction.

8. The DC/DC converter according to claim 5, wherein the subordinate switch control unit increases the value of the voltage, which falls in each cycle, thereby performing the correction.

* * * * *